United States Patent [19]

Roberts et al.

[11] Patent Number: 4,564,326
[45] Date of Patent: Jan. 14, 1986

[54] FEED ARRANGEMENT FOR PICK-AND-PLACE MACHINE

[75] Inventors: William E. Roberts, Rolling Hills Estates; Milo Cripps, Manhattan Beach, both of Calif.

[73] Assignee: Excellon Industries, Torrance, Calif.

[21] Appl. No.: 526,539

[22] Filed: Aug. 25, 1983

[51] Int. Cl.$^4$ ............................................. B65G 59/06
[52] U.S. Cl. .............................. 414/131; 198/468.01; 221/273; 209/918
[58] Field of Search ............. 414/115, 131, 114, 126, 414/128; 221/263, 273; 198/739, 478, 540, 550, 616, 740, 429, 430, 746, 485–490; 29/739, 740, 741, 742, 757–759; 209/573, 908, 909, 911, 916, 918

[56] References Cited

U.S. PATENT DOCUMENTS

| 831,169 | 9/1906 | Long | 194/75 |
| 1,162,156 | 11/1915 | Gray | 198/486 X |
| 1,653,648 | 12/1927 | Malocsay | 198/486 |
| 2,147,055 | 2/1939 | Perkins | 198/429 |
| 2,628,701 | 2/1953 | Schrage | 198/478 |
| 3,019,943 | 2/1962 | Curry | 221/263 |
| 3,486,639 | 12/1969 | Woodside | 414/115 |

FOREIGN PATENT DOCUMENTS

| 1175579 | 6/1960 | France | 198/487 |
| 0009637 | 1/1982 | Japan | 414/131 |

Primary Examiner—Leslie J. Paperner
Assistant Examiner—Lyle Kim
Attorney, Agent, or Firm—Gausewitz, Carr & Rothenberg

[57] ABSTRACT

This invention provides a feed arrangement for chips in a pick-and-place machine in which a vertical magazine feeds chips into a groove in a vibrating table, with the chips being advanced toward a pick station by a gravity actuated lever which will be stopped in the event the groove is full of chips rather than causing the machine to jam or cause damage.

16 Claims, 7 Drawing Figures

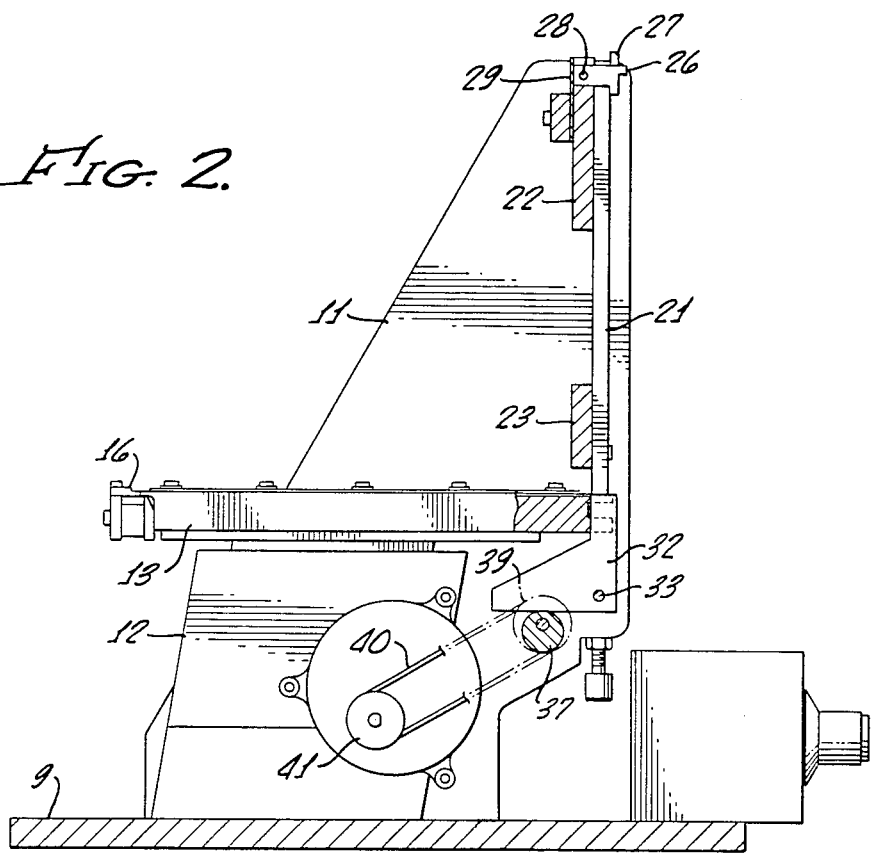
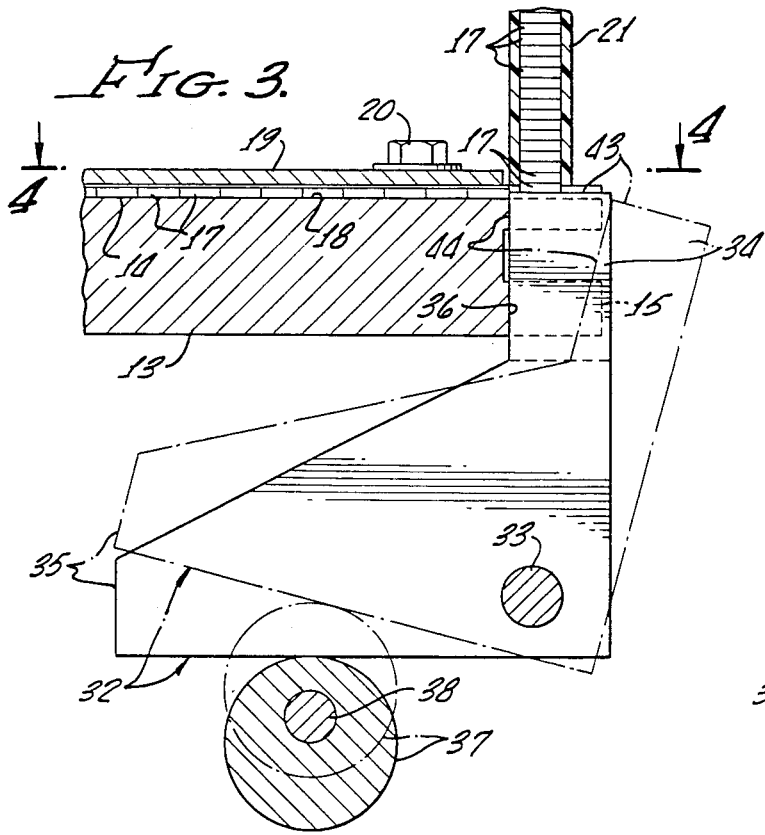
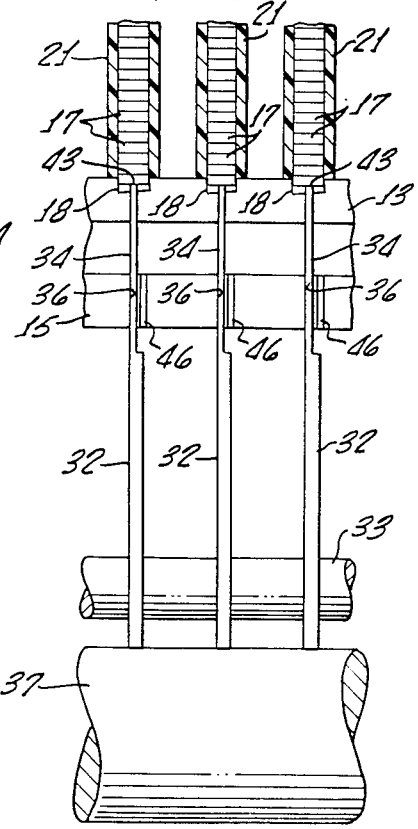

FEED ARRANGEMENT FOR PICK-AND-PLACE MACHINE

BACKGROUND OF THE INVENTION

In pick-and-place machines, it is conventional to provide a number of magazines of a variety of chips, such as resistors and capacitors, which present the chips at the pick station where they are taken to be made a part of the electronic circuit being constructed by the machine. It has been a common practice to provide rather complex and expensive arrangements for feeding the chips to the pick station. This may include positioning the magazine beneath the pick station, each magazine having its own logic and driving circuit to assure that a part is always presented at the top of the magazine tube. The resulting construction is undesirably complicated and expensive, and may lack reliability and ruggedness.

BRIEF DESCRIPTION OF THE INVENTION

The present invention overcomes the difficulties of the prior art, providing a very simple, yet fully reliable, system for feeding the chips in a pick-and-place machine. A very high concentration of chips in a small area is possible through the use of this invention.

The invention includes a vibrating table with a series of grooves extending from the rearward end of the table to stop at the forward end, which is the pick station. Vertical magazines are positioned over the rearward ends of the grooves so that chips will be dropped by gravity into the grooves for feeding to the pick stations. The chips are pushed one at a time down the grooves by a pivotal arm that enters each groove at the rearward end adjacent the exit from the magazine. The arm has an upper arm dimensioned to engage the lowermost chip directly below the magazine, and can pivot about a shaft beneath the magazine to push the chip forwardly in the groove. The rotation of the arm against the chip is effected only by gravity, as the arm is shaped as a bell crank with a relatively massive projecting portion having enough weight to produce the rotational movement. The latter part of the actuating member is engaged by a cam, which will return it to a raised position after it has rotated under the influence of gravity in advancing the chips. Thus, the actuating arm is continually raised and released as the cam rotates.

The fact that there is no positive mechanical drive for the acutating member means that the machine will not become jammed in the event that the feed groove is full of chips and has no room for any additional chips. When that occurs, the acutating arm merely engages the lowermost chip and will go no further, applying a force on this chip insufficient to cause any damage or to cause the chips to be piled up in the feed groove.

This system maintains a quantity of the chips in the feed groove, giving the operator time to change the magazine without interrupting the supply of chips to the pick station.

BRIEF DESCRIPTION OF THE DRAWINGS

FIG. 2 is a side elevational view of the machine;

FIG. 3 is an enlarged fragmentary sectional view of the chip feed arrangement;

FIG. 4 is an end elevational view, partially in section, of the components of FIG. 3;

DETAILED DESCRIPTION OF THE INVENTION

Figure 1:
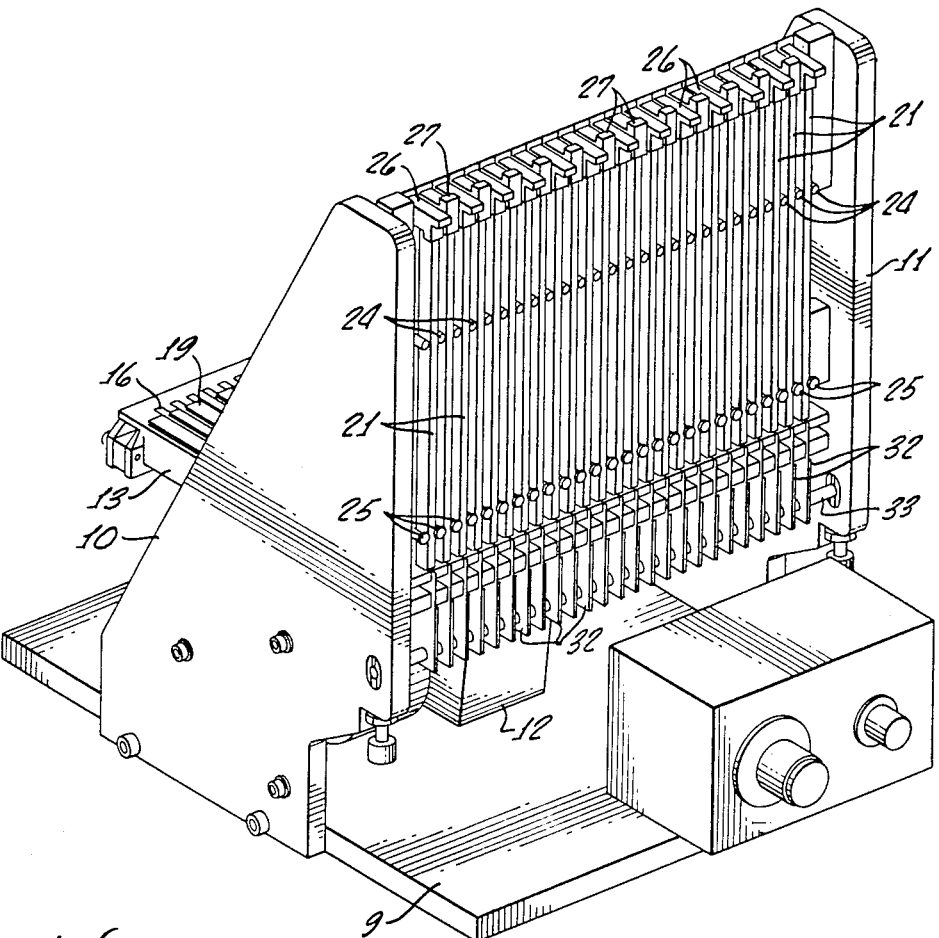
FIG. 1 is a perspective view of the feed portion of a pick-and-place machine embodying this invention.
Figure 5:
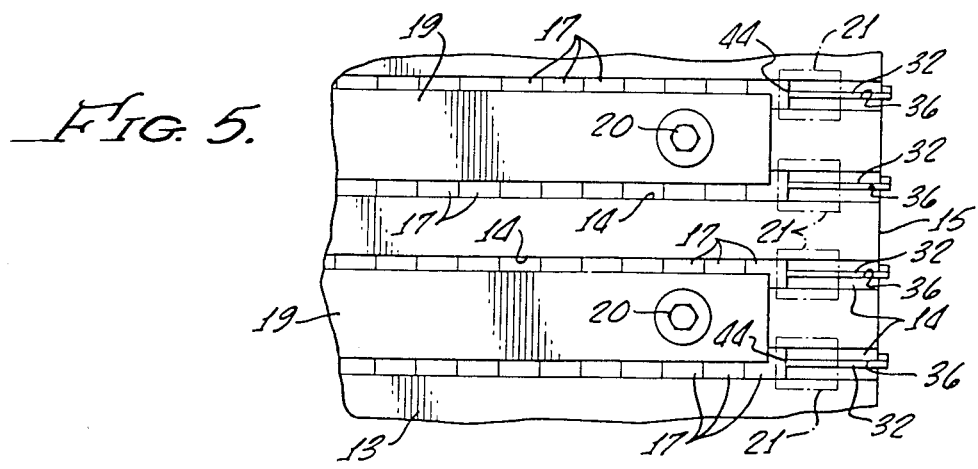
FIG. 5 is a top plan view taken along line 4—4 of FIG. 3.
Figure 6:
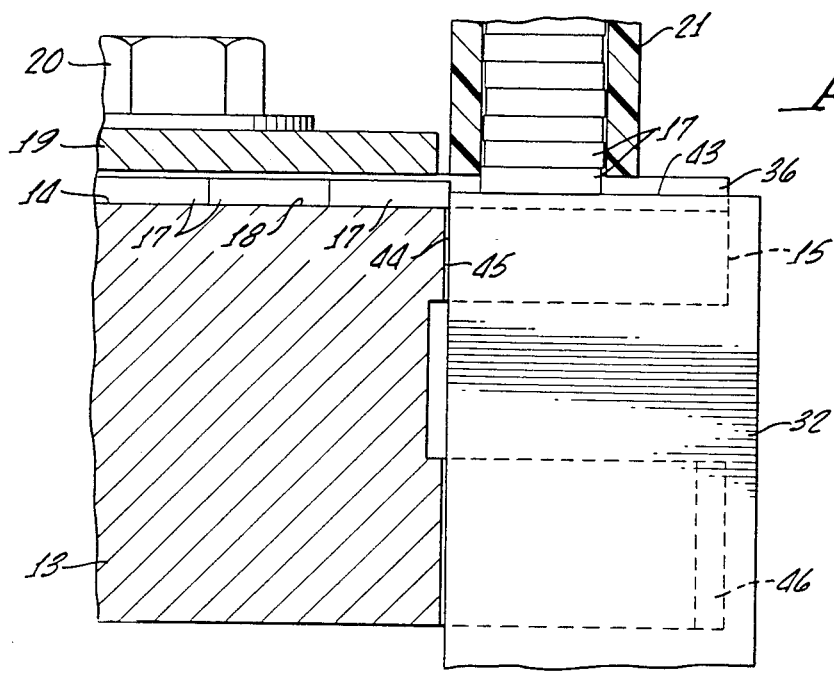
FIG. 6 is an enlarged fragmentary view showing the drive member in its forward position.

The pick-and-place machine, as illustrated in FIGS. 1 and 2, includes a base 9 with vertical gusset plates 10 and 11 at its opposite side edges. A vibrator 12, mounted on the base 9, support a horizontal table 13 between the gusset plates 10 and 11 above the base 10. The table 13 is not attached to the gussets 10 and 11, its side edges being spaced from the gusset plates, so that the table can be vibrated during operation of the machine. Shallow parallel grooves 14, having straight parallel side walls and flat bottom walls, extend from the rearward end 15 of the table 13 to a stop 16 at the forward end of the table. These grooves receive chips 17, such as resistors or capacitors to be assembled in an electronic circuit, guiding them in an edge-to-edge relationship. Thus, the grooves 14 are slightly deeper than the thickness of the chips, as well as being sufficiently wide to allow the chips to pass freely through the groove, while at the same time being accurately guided. The bottom walls 18 of the grooves are inclined laterally, as seen in FIG. 4, which maintain the chips against one groove sidewall and help them to be guided along a straight path without rotation. Strips 19, held by screws 20, are secured to the upper surface of the table 13 to provide covers for the grooves 14. Each strip 19 fits between two grooves, overlapping about half of two adjacent grooves along its side edges (see FIG. 5). This provides visibility, as well as access to the various grooves through the removal of individual cover strips 19 without the necessity of uncovering all of them.

In operation of the machine, the chips 17 are introduced into the grooves 14 adjacent the rearward edge 15 of the table 13 and moved through the grooves to the stop 16 by the vibration of the table. The cover strips 19 do not extend to the stop 16 so that the chip 17 adjacent the stop is exposed. This is the pick station where a conventional mechanism, such as a vacuum chuck, picks up the chip to position it in the circuit being produced at another location on the machine, not shown.

Positioned between the gusset plates 10 and 11 in a vertical orientation are magazines 21, equal in number to the grooves 14. Each magazine is a square tube, suitably made of transparent plastic, adapted to receive a quantity of the chips 17 superimposed one on top of the other. Each magazine has an open bottom end which provides an exit at one of the grooves 14 with which it is aligned. The magazines 21 communicate with the grooves 14 just beyond the rearward ends of the cover strips 19. As a result, the chips 17 can drop down from the magazines 21 into the grooves 14.

The magazines 21 fit against plates 22 and 23 that extend between the gussets 10 and 11. They are spaced apart by a series of upper and lower pins 24 and 25, respectively, carried by the plates 22 and 23. The lower pins 25 are headed and hold the magazines laterally at their lower ends. At the upper ends of the magazines are arms 26 and 27, pivotal about a shaft 28, which fit over and hold the upper magazine ends. Leaf springs 29 bear against the flat ends of the arms 26 and 27 to hold them in position. The arms 26 and 27 can be pivoted by overcoming the sping force, allowing the magazines to be released individually. This permits the operator of the machine to remove empty magazines for replacement with full ones as the machine operates.

The movement of the chips 17 into the grooves 14 is controlled by drive members 32. These are flat plates formed as bell cranks, freely pivotal about a transverse shaft 33 that extends between the support gussets 10 and 11. The drive members 32 include relatively thin upper arms 34 of generally vertical orientation, and thicker generally horizontal arms 35 which project forwardly from the shaft 33. A slot 36 extends into the rearward edge 15 of the table 13 to receive the upper arm 34 of each of the drive members 32. This provides the guides for the drive members 32, which otherwise could shift positions along the shaft 33. The slots 36 extend along the longitudinal axes of the grooves 14 and are intersected by extensions of the longitudinal axes of the magazines 21. Therefore, the slots 36 locate the upper arms 34 of the drive members in alignment with the longitudinal axes of the grooves 14 and permit them to rotate to positions directly beneath the magazines 21.

The drive members 32 are pivoted about the shaft 33 in one direction by a cam 37 extending transversely of the machine. The cam is circular in end elevation and rotatable by a shaft 38 that is eccentric with respect to the cam. A pulley 39 driven by a belt 40, which is rotated by a drive pulley 41, supplies the power to maintain constant rotation of the shaft 38, and hence the cam 37, as the machine is in operation.

When the cam 37 and drive arm 32 are in the solid line position shown in FIG. 3, the upper end portion 34 of the arm is vertical and positioned beneath the magazine 21. The flat upper edge 43 of the arm 32 then is horizontal and spaced above the bottom surface 18 of the slot 14. Therefore, the lowermost chip 17 in the magazine 21 is held by the arm surface 43 above the bottom surface 18 of the groove 14, and the arm 32 supports the entire content of the chips 17 in the magazine 21, preventing them from dropping downwardly. When in this position, the flat forward edge 44 of the upper portion 34 of the arm 32 is vertical and very close to the inner end 45 of the slot 37 in the table 13 that receives the upper end 34 of the arm.

Rotation of the cam 37 180 degrees positions its lobe beneath the forward portion 35 of the arm 32, causing the arm 32 to pivot about the shaft 33, clockwise as shown in FIG. 3, to the position shown in phantom lines. The arm rotates freely to this position without interference with the lower end of the magazine 21 by virtue of the fact that the shaft 33 is located directly beneath the magazine. In this location, the upper end part 34 of the arm 32 is rotated partially out of the slot 36 in the table 13 so that the upper end edge 43 of the arm is moved away from the magazine 21. This allows the column of chips 17 in the magazine 21 to drop downwardly so that the lowermost chip then is entirely within the groove 14 in the table 13, resting upon the bottom surface 18 of the groove.

Continued rotation of the cam 37 will bring it back to the solid line position of FIG. 3, where the cam lobe no longer supports the forward portion 35 of the arm 32. When this occurs, the arm 32 will rotate by the force of gravity about the shaft 33 counterclockwise, as illustrated, from the phantom line position to the solid line position. This takes place because the forward portion 35 of the arm 32 projects away from the shaft 33 in the forward direction much farther than does the considerably lighter upper portion 34 extend in the opposite direction. Hence, the arm 32 is unbalanced on the forward side of the shaft 33, to the left as shown, creating a moment that causes the rotational movement of the arm 32. The result is a controlled force upon the lowermost chip 17 at the bottom of the magazine 21, providing an impetus which pushes the chip into the groove 14 beneath the cover 19. In other words, the upper portion 34 of the arm 32, through its forward edge 44, drives the chip 17 away from the magazine 21 in the groove 14 toward the stop 16 at the pick station. The bottom chip then is freed of the weight of the chips in the magazine 21 and can move through the groove 14 from the vibration of the table 13. In this way, there is a continual flow of chips 17 in the groove 14, maintaining the groove full and assuring the presence of a chip at the pick station.

Figure 7:
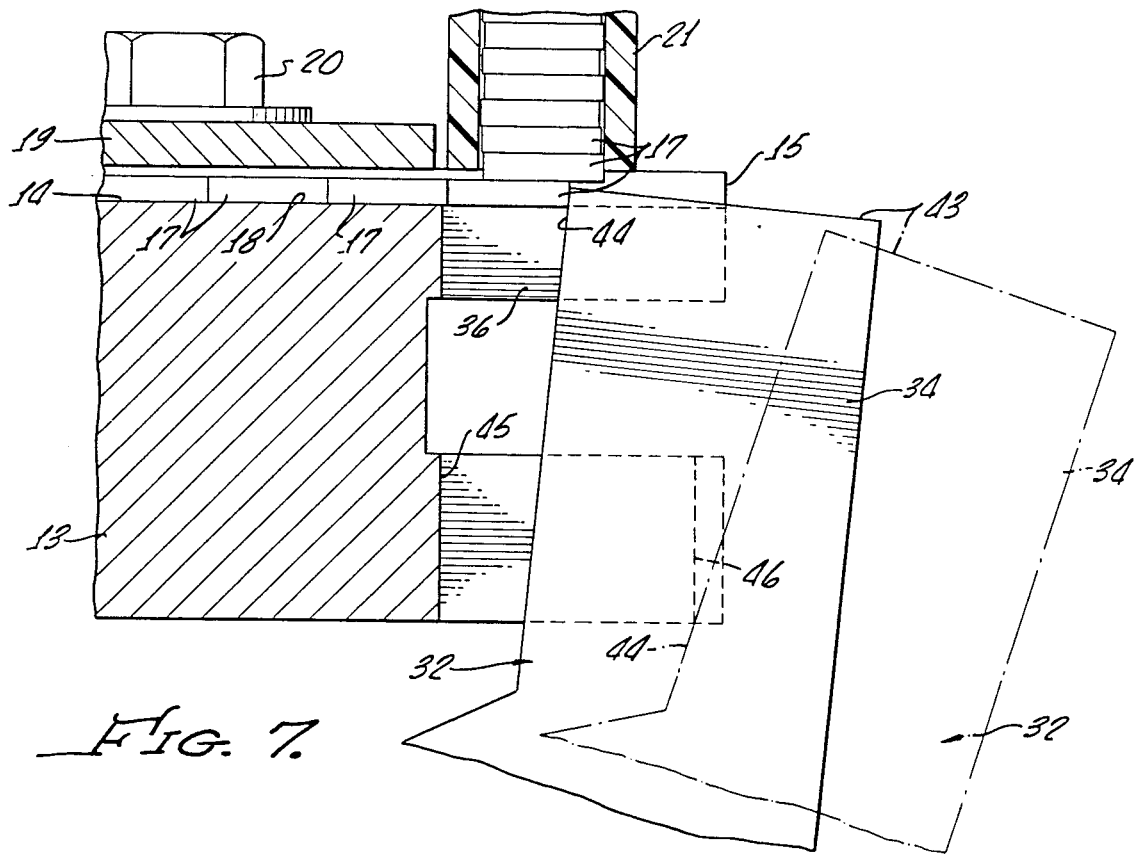
FIG. 7 is a view similar to FIG. 6 illustrating the position of the drive member when the feed groove is full.

In the event that the groove 14 is entirely full of the chips 17, the rotational movement of the arm 32 is arrested by the chip 17 below the magazine 21 which cannot move freely down the groove 14 (see FIG. 7). However, the machine does not jam and no damage occurs. This is because there is no positive mechanical drive for causing the arm 32 to pivot in the direction to advance the chips 17. Instead, there is only the relatively low gravitational force for moving the arm 32 which rotates freely about the shaft 33. This gravitational force is insufficient to cause the arm to exert an excessive force on the chips 17. Hence, so long as the groove 14 is full of the chips 17, the arm 32 will engage the lowermost chip with each rotation of the cam 37 that allows it to pivot under the influence of gravity. However, no movement of the chips 17 will take place until one has been removed from the pick station.

For removal of any of the magazines 21, the adjacent drive member 32 may be rotated out of the slot 36 and moved slightly to one side to enter a shallow groove 46. This position of the drive member is shown in phantom in FIG. 7. The shallow groove 46 holds the drive member out of the way as the magazine is changed.

The foregoing detailed description is to be clearly understood as given by way of illustration and example only, the spirit and scope of this invention being limited solely by the appended claims.

What is claimed is:

1. A feed arrangement for chips in a pick-and-place machine comprising
a first guide means having an entrance for receiving chips and means for directing said chips to a predetermined location,
a second guide means having an outlet for delivering chips one at a time at a location adjacent said entrance,
a drive member,
means for pivotally mounting said drive member for rotational movement, said drive member including an unbalanced mass for causing such rotation from a first position to a second position by gravity, said second position being adjacent said entrance,
said drive member having a portion thereof adjacent said entrance and engageable with a chip delivered by said second guide means for pushing said chip into said entrance of said first guide means upon such rotational movement of said drive member,
and means for positioning said drive member in said first position following such rotational movement thereof.

2. A device as recited in claim 1 in which said drive member is freely rotatable from said first position to said second position thereof about said means for pivotally mounting said drive member so that said drive member can be stopped from rotation by a chip so delivered by said second guide means in event said chip is blocked from moving freely into said first guide means.

3. A device as recited in claim 1 in which said drive member includes means for preventing said second guide means from so delivering chips when said drive member is in said second position thereof.

4. A chip feeding arrangement for a pick-and-place machine comprising a first guide means for receiving a plurality of superimposed chips,
    said first guide means having an exit at a predetermined location and being elevated so that said chips move by gravity through said first guide means to said exit,
a second guide means having an extrance adjacent said exit and dimensioned to conduct said chips in an edge-to-edge relationship to a predetermined location for being individually picked up,
a drive member,
pivot means for supporting said drive member for pivotal movement between a first position and a second position,
    said drive member having an upper end portion remote from said exit and said entrance when said drive member is in said first position thereof and adjacent said exit and within said entrance when said drive member is in said second position thereof for thereby engaging and advancing a chip from said exit through said entrance into said second guide means upon movement of said drive member from said first position to said second position thereof,
    said drive member including a portion on one side of said pivotal mounting means for providing sufficient mass to cause said drive member to rotate by gravity from said first position to said second position thereof,
and means for rotating said drive member from said second position to said first position and then releasing said drive member for said movement from said first position to said second position thereof.

5. A device as recited in claim 4 in which said means for rotating said drive member is a cam.

6. A device as recited in claim 4 in which said pivot means includes means for permitting said drive member to move freely in said pivotal movement from said first position to said second position thereof solely by gravity, wherein said drive member can be stopped by such engagement with a chip from said exit in the event said second guide means is entirely full of chips so as to block the movement of said chips in said second guide means.

7. A device as recited in claim 6 in which said upper end portion of said drive member blocks said exit when said drive member is in said second position thereof for preventing said chips from reaching said entrance.

8. A chip feeding arrangement for a pick-and-place machine comprising
an upstanding guide member dimensioned to receive a plurality of chips positioned one on top of the other,
    said guide member having a bottom exit for discharging said chips therefrom by gravity,
a vibrating table means,
    said table means including a groove in its upper surface having one portion beneath said exit of said guide means for receiving chips therefrom and another portion spaced therefrom for presenting said chips for being picked up,
    said table means including a slot therein extending longitudinally into said groove beneath said exit,
a drive member,
means for pivotally mounting said drive member for rotation about a predetermined axis from a first position to a second position,
    said drive member having an upper end portion received in said slot and beneath said exit when said drive member is in said second position and remote from said exit from said drive member is in said first position, whereby a chip can be discharged from said exit into said groove when said drive member is in said first position,
    said drive member including a portion projecting beyond said pivotal mounting means for providing an unbalanced mass such as to cause said drive member to rotate by gravity from said first position to said second position,
    said upper portion of said drive member having a forward edge engageable with a chip so discharged into said groove upon said rotation of said drive member from said first position to said second position for advancing said chip in said groove toward said second portion of said groove, and
cam means for rotating said drive member from said second position to said first position and thereafter releasing said drive member for said movement from said first position to said second position.

9. A device as recited in claim 8 in which said predetermined axis is directly beneath said exit and spaced therefrom.

10. A device as recited in claim 8 in which said means for pivotally mounting said drive member includes a shaft, said drive member being movable axially relative to said shaft, said slot closely receiving said drive member and guiding the same during rotation thereof between said first and second positions.

11. A device as recited in claim 10 in which said table includes a second slot adjacent said first mentioned slot, said second slot being remote from said guide member, said upper end portion of said drive member being removable from said first mentioned slot and positionable in said second slot for permitting access to servicing of said guide member.

12. A device as recited in claim 10 in which said drive member is freely rotatable about said predetermined axis from said first position to said second position thereof solely by said unbalanced mass, whereby rotational movement of said drive member from said second position to said first position can be arrested by such engagement of said forward edge of said upper portion in the event said groove is entirely full of said chips so as to preclude free movement thereof.

13. A device as recited in claim 12 in which said upper end portion of said drive member has an upper edge surface engageable by the lowermost chip in said guide member when said drive member is in said first position, for precluding discharge of said lowermost chip into said groove.

14. A device as recited in claim 13 in which said drive member is shaped as a bell crank, said upper end portion comprising one arm and said projecting portion comprising the other arm of said bell crank.

15. A device as recited in claim 8 in which said guide member is tubular, and including means for removably positioning said guide member so that one portion of said groove is beneath said exit of said guide member.

16. A feed arrangement for chips in a pick-and-place machine comprising
   a first guide means having an entrance for receiving chips and means for directing said chips to a predetermined location,
   a second guide means for delivering chips one at a time at a location adjacent said entrance,
   a drive member,
   said drive member being movable by gravity from a first position to a second position,
   said drive member in said second position thereof being adjacent said entrance, and being engageable with a chip delivered by said second guide means for pushing said chip into said entrance in said first guide means upons said movement of said drive member by gravity from said first position to said second position,
   and means for positioning said drive member in said first position thereof following such movement of said drive member from said first position to said second position thereof, and then releasing said drive member to subsequently so moving from said first position to said second position thereof.

* * * * *

UNITED STATES PATENT AND TRADEMARK OFFICE
CERTIFICATE OF CORRECTION

PATENT NO. : 4,564,326

DATED : Jan. 14, 1986

INVENTOR(S) : William E. Roberts and Milo Cripps

It is certified that error appears in the above-identified patent and that said Letters Patent is hereby corrected as shown below:

Claim 8, column 6, line 16, "from" (second occurrence) should read ---when---.

Claim 16, column 8, line 7, "upons" should read ---upon---.

Signed and Sealed this

Fifteenth Day of April 1986

[SEAL]

*Attest:*

*Attesting Officer*

DONALD J. QUIGG

*Commissioner of Patents and Trademarks*